United States Patent Office 2,766,851
Patented Oct. 16, 1956

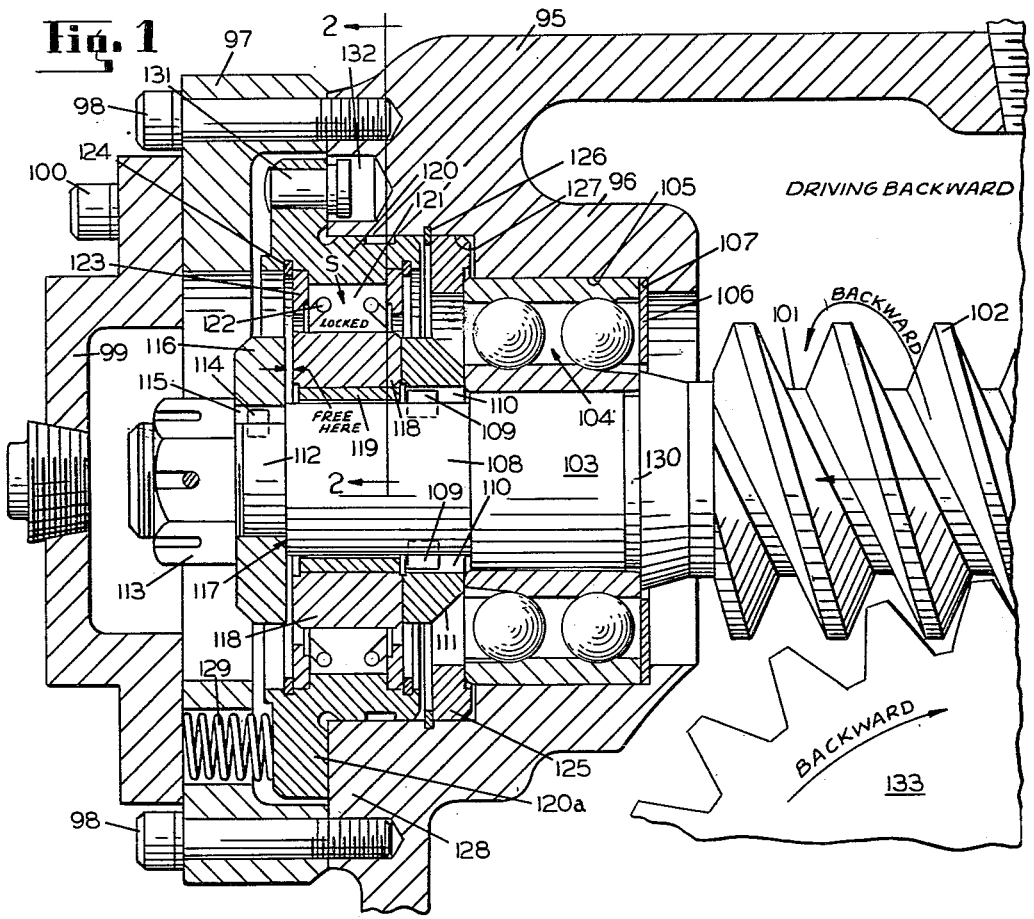
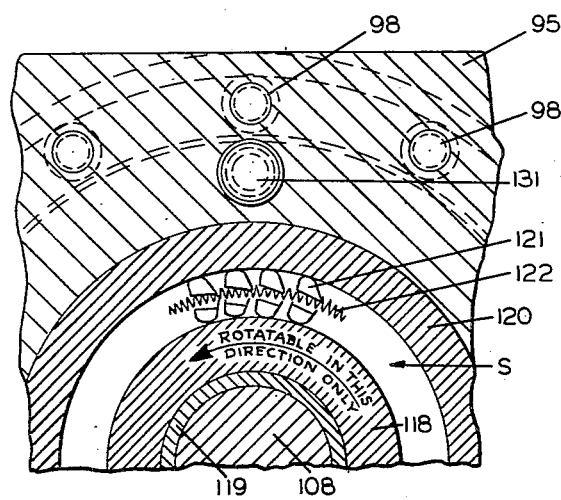

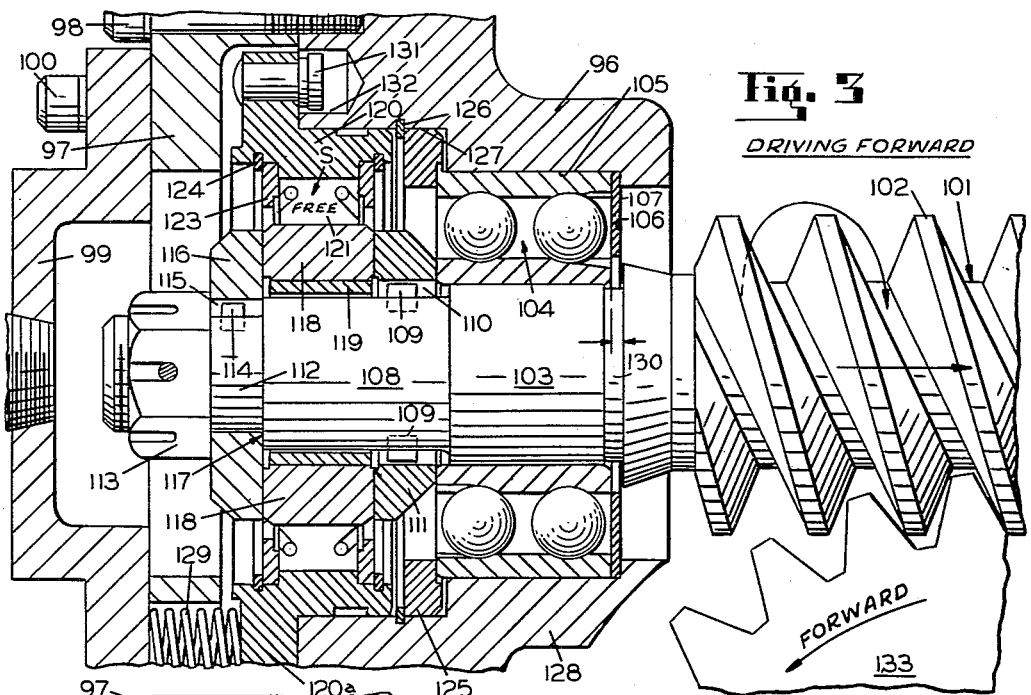
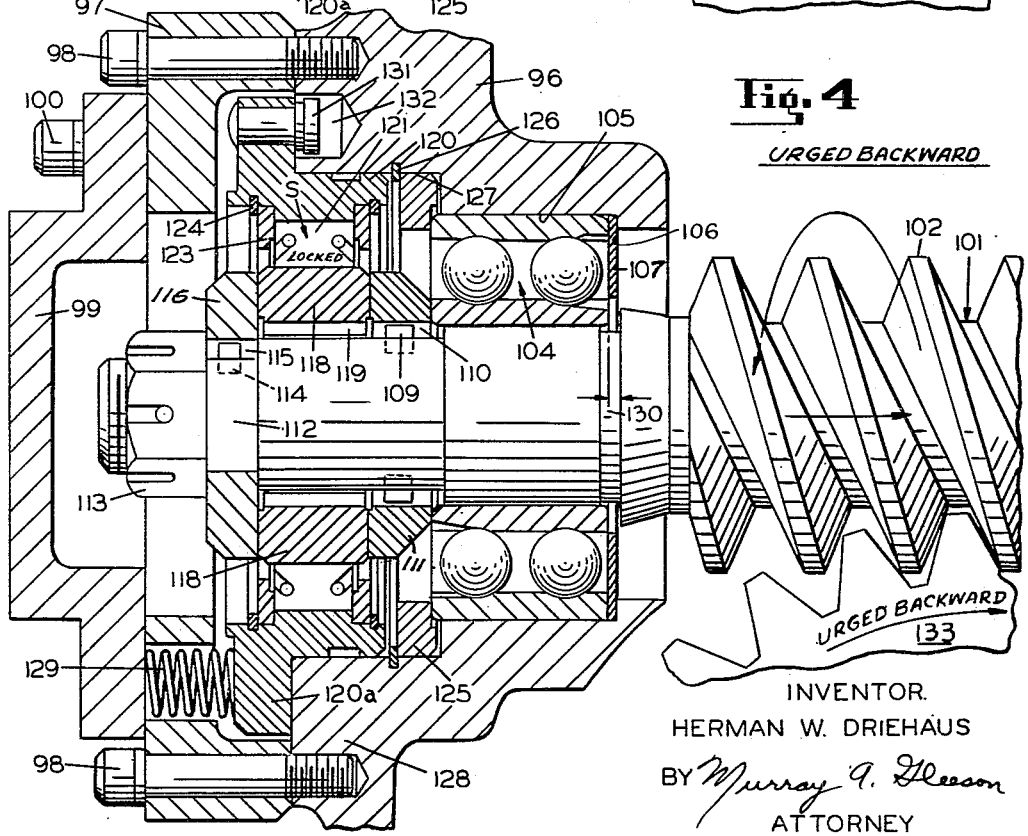

2,766,851

ANTI-BACKDRIVE GEARING

Herman W. Driehaus, Chicago, Ill., assignor to Goodman Manufacturing Company, Chicago, Ill., a corporation of Illinois Application March 26, 1952, Serial No. 278,713

10 Claims. (Cl. 188—82.8)

This invention relates to improvements in anti-backdrive mechanism for mobile machines or vehicles of the track laying type which permits driving the vehicle forwardly or in reverse in the usual manner by the power means provided by the machine, but which mechanism positively prevents backdriving in a desired direction.

The term "backdriving" as used herein means movement of the vehicle forwardly or rearwardly by an outside force such as by gravity or by the reaction to a thrust exerted by the mechanism of the vehicle while operating, such as occurs where the machine is a mining machine working at the face of the mine, for example. Broadly considered, the backdriving referred to herein might arise from any exterior force exerted on the machine in a direction to move the machine on its endless treads or tracks other than from its own motive unit, such as an electric motor or motors or other types of power mechanism. The invention here under consideration has particular reference to vehicular machines having endless tracks or treads as distinguished from wheels equipped with brakes which might be set to prevent backdriving or coasting either forwardly or in reverse.

One object of the present invention is to provide antibackdriving mechanism for an endless tread or track laying type vehicle which prevents undesirable backdriving of the vehicle and hence tends to retain the machine or vehicle in a selected position during the operation thereof in performing its primary function, such as coal loading or mining, or performing another or other functions.

Another object of the invention is to provide antibackdrive mechanisms for machines of the endless track or endless tread type, which mechanisms are adapted to prevent undesirable backdriving of either tread in either a forward or rearward direction.

An additional object of the invention is to provide an anti-backdriving unit of a structure for such a machine which prevents backdriving in one direction only, whereby the machine can be towed or pushed in the other direction by an outside force, as in the event of failure of its own motive power unit, or in the event of the inaccessibility of a source of current for the power unit of the machine when the latter is an electric motor or motors, for example.

The structures shown in the drawing for illustrative purposes are pertinent portions of electrically driven mining machines which operate at the face of a coal seam, for example, in cutting kerfs in the coal for releasing the coal for removal from the mine. The invention herein later described in detail is adapted for use with other types of machines which travel on endless tracks or treads also but which, for purposes of efficiency in their normal operation, should be held against backdriving in response to thrusts exerted by the machine as it operates, as well as against coasting movement due to an inclination of a supporting surface. In a described form of the invention, the improved mechanism functions to prevent undesirable movement of the vehicle in one direction only.

Other objects of the invention will be apparent from a consideration of the following specification and accompanying drawings wherein:

Fig. 1 is a broken longitudinal or axial sectional view of an anti-backdriving mechanism which automatically prevents backdriving in one direction only, while permitting movement of the vehicle in the other direction by application of an exterior force, the said figure illustrating the relationship of the parts when an associated endless tread or track of a vehicle (not illustrated) is being operated for motive purposes in one direction;

Fig. 2 is a broken sectional view taken on the line 2—2 of Fig. 1;

Fig. 3 is a view similar to Fig. 1 but showing the relationship of the parts of the mechanism when the vehicle is driven by a motive power unit in the other direction; and Fig. 4 is a view similar to Figs. 1 and 2 when the antibackdriving mechanism is in braking or locked position for preventing movement of the machine in one direction by an exterior force exerted thereon tending to move the machine in such direction.

Reference will now be made to the details of the embodiment of the invention shown in Figs. 1-4, inclusive. In this form of the invention, backdriving of the machine in a backward direction is prevented, but not backdriving in a forward direction. The reverse could be employed where conditions of use of the machine render such desirable. Hence the mechanism illustrated permits the machine to be towed or pushed or to coast in a forward direction.

In Fig. 1 a casing for the improved structure is indicated by the numeral 95 and in the form illustrated is provided with an internal, integral extension 96 of generally cylindrical form. An intermediate housing portion 97 is mounted on the end of casing 95 by means of cap screws 98 and in conjunction with the portion 96 provides a housing for the improved mechanism hereinafter described. A cap 99 is mounted on the housing portion 97 by means of cap screws 100.

A worm shaft which is power operated for driving one of the endless tracks or treads of the machine is designated generally by the numeral 101 and comprises a worm portion 102, a reduced diameter portion 103 which is mounted within a double ball bearing indicated generally by the numeral 104, the latter being seated within a bore 105 formed in the portion 96 of the housing and spaced from a shoulder 106 at the right-hand end of the portion 96 by means of a spacer washer 107. The spacer washer 107 may in some cases be eliminated but it has been found to be desirable for the purpose of oil retention. To the left of portion 103 as viewed in Fig. 1 the worm shaft 101 is provided with a further reduced diameter portion 108. The portion 108 is provided with a pair of diametrically opposed keys 109 which engage corresponding milled slots 110 in a brake collar or plate 111 which embraces the portion 108 of the worm shaft and rotates with the shaft, but is free to shift back and forth within a limited range longitudinally on the shaft as required from time to time. At the left-hand end of the worm shaft as viewed in Fig. 1 is another reduced portion designated by the numeral 112 which is threaded for engagement by a nut 113. The portion 112 carries a key 114 which engages a keyway 115 milled in a brake collar or plate 116. In assembling the unit, the nut 113 is screwed on to the end of the worm shaft until it positions the collar 116 against a shoulder 117 on the shaft. The brake collar 116, being confined between the nut 113 and the shoulder 117, must shift axially with the shaft and due to the key 114, the collar is constrained to rotate with the shaft. By contrast the other brake collar 111 is free to float or slide back and forth on the worm shaft through a limited range, but like collar 116 it is constrained to rotate with the shaft.

Between the collars 111 and 116 is an inner race 118 for a sprag unit to be described. The race 118 has a bushing 119 pressed into it, the bushing being rotatably journaled on the portion 108 of the worm shaft. The end surfaces of the race 118 constitute brake surfaces which are adapted for breaking engagement with the adjacent end surfaces of the collars 111 and 116 although suitable brake lining material may be employed between the cooperating braking surfaces.

A sprag unit, which is generally designated by letter S, includes a non-rotatable outer race member 120 and a plurality of individual sprags 121 interposed between the races 118 and 120, the individual sprags being arranged in annular form and secured together by a pair of endless coil springs 122, fitted in suitable slots formed in the sides of the sprags as indicated in Fig. 2. The sprag elements 121 are maintained in alignment by means of retainers 123 which are held in place by snap rings 124 seated within grooves provided in the outer race 120.

A retainer 125 is provided for holding the ball bearing 104 against displacement to the left, as viewed in Fig. 1, the retainer itself being kept in place by a snap ring 126 seated in a receiving groove formed in the cylindrical surface 127 of the housing. The external surface of the outer race 120 comprises an outer cylindrical portion which is slidable in an axial direction along the surface 127. Hence, the entire sprag assembly, including the inner and outer sprag races 118 and 120 and the sprag elements 121, is shiftable back and forth relative to the worm shaft 101 due to the sliding engagement of the outer race 120 within the bore 127. The outer race 120 is provided with a flange 120a which engages a shoulder 128 in the housing upon movement of the race fully to the right as viewed in Fig. 1. The outer race is continuously urged inwardly or to the right by means of compression coil springs 129 which are seated between the flange 120a and the cap 99. The springs thus tend to move the flange 120a into engagement with the shoulder 128 as illustrated in Fig. 1.

The worm shaft 101 is capable of shifting in both axial directions within a limited range. Shifting movement of the shaft 101 to the right is limited by engagement of the collar 116 with the inner race 118 when both members 116 and 118 are in their extreme right hand positions. Shifting movement of the shaft to the left is limited by engagement of a shoulder 130 on the shaft with the adjacent end surface of the inner race of bearing 104.

It will be seen in Fig. 2 that the sprag elements 121 are so oriented that they will lock whenever the inner race 118 is turned clockwise as viewed in said figure, or as viewed from the right of Fig. 1. The sprag elements will permit counterclockwise rotation of the inner race 118 with respect to the outer race 120. The race 120 however, is retained against rotation by a pin 131 extending from the flange 120a into a receiving recess 132 provided in the shoulder 128.

Operation of figure embodiment of Figs. 1–4

Let it be assumed that the brake collars 111 and 116 are in braking contact with the ends of the inner race 118 as shown in Fig. 3 and that the shaft 101 is to be rotated in a clockwise direction as viewed in Fig. 2.

This clockwise direction of the shaft may be that which imparts driving action from a motor, not shown, via the worm 102 and worm wheel 133 to the endless track or tread and other associated mechanism not shown, to produce a rearward movement of the vehicle. As the shaft starts to rotate in the clockwise direction, the worm 102 will react against the worm wheel 133 and shift to the left until the shoulder 130 is engaged with the inner race of the bearing 104. This shifting action of the shaft causes the collar 116 to move to the left away from the sprag inner race 118 to the position indicated in Fig. 1.

The inner race 118 being thus no longer clamped in braking relation between the brake collars 111 and 116, is free to shift to the left out of forcible engagement with the collar 111. Since the clockwise rotation of the worm shaft will urge the inner race 118 in a clockwise direction as viewed in Fig. 2, the sprags 121 lock the inner and outer races together against relative rotation. Therefore, to permit the necessary shifting of the inner race 118 to the left to ease the pressure against the collar 111, provision is made for permitting the entire sprag unit including both races, to shift leftwise. This is provided by permitting the outer race to shift within the bore 127, as already described. The outer race 120 is held against rotation by means of the pin 131 which is loosely seated within the recess 132 in the casing 95. Thus, it will be seen that while the sprags lock the inner race 118 against clockwise rotation, the race is wholly free of braking contact with brake collar 116 and substantially free of braking contact with collar 111 since the race is retained in contact with collar 111 only by the slight pressure exerted by the relatively small springs 129 acting against the outer race 120. The driving action from the motor through the worm shaft is therefore free of any substantial braking action when the shaft 101 is driven by the motor in a clockwise direction which moves the vehicle in a rearward direction, for example.

Fig. 3 illustrates the relation of the parts when the worm shaft 101 is driven by the motor, not shown, in a counterclockwise direction as viewed in Fig. 2 for rotating the worm wheel 133 counterclockwise as viewed in Fig. 3 for moving the vehicle forwardly. Under these conditions the thrust reaction of the worm against the worm wheel shifts the shaft to the right carrying with it the brake collar 116 and frictionally locking the inner race 118 between the brake collars 111 and 116. The race 118 will thus rotate with the shaft, but since during the counterclockwise movement of the sprags the same are ineffective or unlocked, the shaft will be free of any braking action. Hence, the motor can operate the treads of the vehicle to move the vehicle forwardly as well as rearwardly. In other words, when the shaft 101 is operated by its power source in either direction to propel the machine, the anti-backdrive mechanism is ineffective.

Fig. 4 illustrates the cooperative functioning of the brake mechanism, where, due to a rearwardly directed thrust on the machine, as a mining machine working at the face of the mine or where, due to a steep incline, for example, the machine tends to backdrive through the worm wheel 133 and rotate the worm wheel 133 in a clockwise direction which will impart clockwise rotation to the worm shaft as viewed in Fig. 2. Initial clockwise movement of the worm wheel 133 causes the worm shaft 101 to shift to the right due to the thrust reaction against the latter. The shifting of the worm shaft in this direction frictionally locks the inner race 118 of the sprag unit between the collars 111 and 116. Since the inner race 118 cannot rotate in a clockwise direction by reason of the locking action of the sprags, the mechanism is effective in preventing rotation of the worm shaft by the worm wheel during the assumed tendency of the machine to backdrive in the direction mentioned. Hence, with the present improvements in use with the motor driven worm shafts of a mining machine, rearward movement of the machine is resisted except where the movement results from power regularly delivered by the driving motor to the respective worm shaft.

While the mechanism shown in Figs. 1–4 prevents backdriving in a rearward direction, it enables the machine to be towed forwardly or to backdrive in a forward direction. Viewing Fig. 4, again let it be assumed that an outside force is exerted on the machine to move it in a forward direction, thus driving the worm gear 133 in a counterclockwise direction. The thrust of the worm gear against the shaft 101 will then be to the left, shifting the shaft in that direction including the brake collar 116, to release the braking action on the inner race 118.

Since the rotation of worm wheel 133 in the counterclockwise direction will produce rotation of the worm shaft 101 in the clockwise direction as viewed from the right in Fig. 4, the sprags will lock the inner race 118 to the outer race 120 and rotation of the inner race will be prevented, but since the inner race is not in braking engagement with the collars 111 and 116, no braking action occurs and hence the machine can be towed or otherwise moved in a forward direction without impedance by the improved mechanism.

While an axially shiftable worm shaft 101 and cooperating worm wheel 133 having been illustrated in Figs. 1 to 4, other suitable gearing including an axially shiftable shaft may, of course, be provided within the scope of the present invention for transmitting power from a motor to a driving mechanism of a vehicle when the vehicle is to be driven by the motor, and which shaft by reason of its shifting movements will effect the setting of a brake mechanism for holding the vehicle or machine against backdriving through power derived from the tread or treads of the machine.

While one form of the invention has been shown in the drawings for the purpose of illustration, it will be apparent that departure from the precise mechanism shown may be resorted to without departure from the invention defined by the appended claims.

I claim:

1. Anti-back drive mechanism comprising a drive shaft adapted to be driven in either rotative direction by a power source, driving means mounted on said drive shaft and interacting with driven means for driving thereof in either direction as the said drive shaft is driven from the power source in a correlative direction, said drive shaft being shiftable axially in one direction or the other by reaction between said driving means and said driven means as determined by the direction of rotation of said drive shaft, and being also shiftable axially by the reaction between said driving and said driven means upon backdriving of said driven means, an overrunning clutch comprising a first clutch member, a second clutch member mounted on said drive shaft, means affording a clutching connection between said clutch members and operative to resist rotative movement of said second clutch member in one direction, and a brake comprising brake elements mounted for rotation with said driving shaft, one of which is movable axially on said shaft upon backdriving of said driven means in a direction tending to produce rotative movement of said driving shaft in a direction corresponding to such backdriving, so that said brake elements are in braking engagement with one of said clutch members to resist such last described tendency of said drive shaft, said movable brake element being shiftable away from the said one clutch member upon backdriving in another direction to free said one clutch member.

2. Anti-back drive mechanism according to claim 1 wherein said first clutch member is shiftable axially with said second clutch member so that upon reversal of said drive shaft the braking effect of said brake elements is nullified irrespective of whether both of said brake elements are out of contact with said second clutch member.

3. Anti-back drive gearing including a housing having a driven gear member rotatably mounted therein; an oblique-toothed driving gear member meshed with said driven gear member and mounted within said housing for rotation and for axial reciprocation between operative positions responsive to reaction against the driven gear member; one-way clutch means comprising a rotatable race which is axially reciprocable, a circularly-extending non-rotatable race mounted for axial reciprocation within said housing, and sprags frictionally interposed between said races and effective to block rotation of the rotatable race in one direction; said sprags and races being frictionally locked for unitary reciprocal movement when said rotatable race is urged in its said blocking direction; means effective to connect and disconnect said rotatable race with said driving gear member responsive to axial movement of the latter between its said operative positions; the shifting of the driving gear member in a direction to disconnect said means while turning in a direction to urge the rotatable race in its blocked direction being effective to permit shifting of said sprags and both of said races as a unit in a direction to facilitate disconnection of said means with said rotatable race.

4. Anti-back drive gearing according to claim 3 having biasing means for urging said non-rotatable race in one direction.

5. Anti-back drive gearing including a housing having driven gear means rotatably mounted therein; driving gear means meshed with said driven gear means and mounted within said housing for rotation and for axial reciprocation between operative positions responsive to reaction against the driven gear means; one-way clutch means comprising a rotatable race which is axially reciprocable, a non-rotatable race mounted for axial reciprocation within said housing, and sprags frictionally interposed between said races and effective to block rotation of the rotatable race in one direction; said sprags and races being frictionally locked for unitary reciprocal movement when said rotatable race is urged in its said blocked direction; means including elements rotatable with said driving gear means and engageable separately with said rotatable race and responsive to axial movement of said driving gear means between its said operative positions, one of said elements being movable with said driving gear means; whereby upon driving said driving gear means in a direction to urge the rotatable race in a blocked direction, said driving gear means is shifted in an axial direction to cause disengagement of one of said elements from the rotatable race following which both of said races and the sprags are free to shift as a unit away from the other of said elements.

6. Anti-back drive gearing including a housing having a driven gear member rotatably mounted therein; an oblique-toothed driving gear member meshed with said driven gear member and mounted within said housing for rotation and for axial reciprocation between operative positions responsive to reaction against the driven gear member; one-way clutch means comprising a rotatable race which is axially reciprocable, a non-rotatable race mounted for axial reciprocation within said housing, and sprags frictionally interposed between said races and effective to block rotation of the rotatable race in one direction; said sprags and races being frictionally locked for unitary reciprocal movement when said rotatable race is urged in its said blocked direction; means including a pair of elements rotatable with said driving gear member and engageable separately with said rotatable race; said means being responsive in their movement to axial movement of said driving gear member between its said operative positions, one of said elements being movable with said driving gear member, whereby upon driving said driving gear member in a direction to urge the rotatable race in a blocked direction, said driving gear member is shifted in an axial direction to disengage said one element from the rotatable race following which both of said races and the sprags are free to shift as a unit away from the other element.

7. Anti-back drive gearing including a housing having a driven gear member rotatably mounted therein; an oblique-toothed driving gear member meshed with said driven gear member and mounted within said housing for rotation and for axial reciprocation between operative positions responsive to reaction against the driven gear member; one-way clutch means comprising a non-rotatable support mounted within said housing for movement along an axis coincident to the axis of rotation of the driving gear member, and a rotatable member rotatable in one direction about the axis of said driving gear member and blocked against rotation in the opposite direction, said non-rotatable support and said rotatable member being locked together and movable as a unit when the latter is urged in the blocked direction; means including a pair of collars rotatably carried by said driving gear member on opposite sides of said rotatable member, one of said collars being movable with said driving gear member, the other collar being axially movable relative thereto whereby axial shifting of said driving gear member to one operative position causes said rotatable clutch member to be engaged between said collars for rotation therewith; and whereby upon further driving of said driving gear member in a direction to urge said rotatable member in a blocked direction and to shift the driving gear in a direction to release the movable collar from the rotatable member, said non-rotatable support, said rotatable member and said sprags are free to shift axially as a unit in a direction to relieve the bearing stresses between the rotatable clutch member and the collar movable relative to said driving gear member.

8. Anti-back drive gearing including a housing having a worm wheel member rotatably mounted therein; a worm member meshed with said worm wheel and mounted within said housing for rotation and for axial reciprocation between operative positions responsive to reaction against the worm wheel; friction-type one-way clutch means comprising inner and outer races with sprags frictionally interposed therebetween to block relative rotation in one direction, the inner race being rotatably and reciprocally journaled on said worm member, the outer race being mounted for reciprocation within said housing; means acting between the worm member and inner race comprising a pair of collars rotatably carried by said worm member on opposite sides of said inner race, and means for moving said collars toward and away from positions of frictional engagement with said inner race responsive to axial shifting movement of said worm member in one direction and in an opposite direction respectively; whereby shifting of the worm member in said opposite direction while turning in a direction to urge the inner race in its blocked direction is effective to permit shifting of the inner and outer races and sprags, as a unit, to relieve the frictional engagement between the inner race and one of said collars.

9. Anti-back drive gearing according to claim 8 having means for biasing said outer race in one reciprocal direction.

10. Anti-back drive gearing including a housing having a worm wheel member rotatably mounted therein; a worm member meshed with said worm wheel and mounted within said housing for rotation and for axial reciprocation between operative positions responsive to reaction against the worm wheel; friction-type one-way clutch means comprising inner and outer races with sprags frictionally interposed therebetween to block relative rotation in one direction, the inner race being rotatably and reciprocably journaled on said worm member, the outer race being mounted for reciprocation within said housing; means acting between the worm member and inner race comprising a pair of collars rotatably carried by said worm member on opposite sides of said inner race, one of said collars being fixed and the other splined to said worm member, a stop engageable with the splined collar for limiting shifting movement thereof relative to the worm member for frictionally engaging said inner race between said collars responsive to shifting of said worm member in one direction; whereby, shifting of said worm member in the opposite direction while turning in a direction to urge the inner race in its blocked direction is effective to positively relieve bearing pressures between the collars and the inner race while permitting axial shifting of the races and sprags, as a unit, in a direction to facilitate such bearing pressure relief.

References Cited in the file of this patent
UNITED STATES PATENTS

| | | |
|---|---|---|
| 2,008,873 | Nydegger | July 23, 1935 |
| 2,393,120 | Perman | Jan. 15, 1946 |
| 2,440,304 | Simmons | Apr. 27, 1948 |
| 2,477,176 | Gruenberg et al. | July 26, 1949 |
| 2,569,108 | Koch | Sept. 25, 1951 |